(12) United States Patent
Kondo

(10) Patent No.: US 9,247,128 B2
(45) Date of Patent: Jan. 26, 2016

(54) IMAGING APPARATUS, METHOD FOR CONTROLLING IMAGING APPARATUS, AND PROGRAM

(71) Applicant: CANON KABUSHIKI KAISHA, Tokyo (JP)

(72) Inventor: Emi Kondo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 14/361,932

(22) PCT Filed: Nov. 29, 2012

(86) PCT No.: PCT/JP2012/007671
§ 371 (c)(1),
(2) Date: May 30, 2014

(87) PCT Pub. No.: WO2013/080554
PCT Pub. Date: Jun. 6, 2013

(65) Prior Publication Data
US 2015/0296124 A1    Oct. 15, 2015

(30) Foreign Application Priority Data
Dec. 1, 2011    (JP) ................. 2011-263705

(51) Int. Cl.
*H04N 5/232*    (2006.01)
*G02B 7/36*    (2006.01)

(52) U.S. Cl.
CPC .............. *H04N 5/23212* (2013.01); *G02B 7/36* (2013.01)

(58) Field of Classification Search
CPC ......... H04N 5/23212; G02B 7/36; G02B 7/28
See application file for complete search history.

(56) References Cited

U.S. PATENT DOCUMENTS

| | | | |
|---|---|---|---|
| 8,605,942 B2 * | 12/2013 | Takeuchi | G06T 7/204 348/135 |
| 2008/0075337 A1 * | 3/2008 | Fukushi | G06K 9/00255 382/118 |
| 2010/0232646 A1 * | 9/2010 | Takeuchi | G06T 7/204 382/103 |

FOREIGN PATENT DOCUMENTS

| | | |
|---|---|---|
| JP | 9-043500 A | 2/1997 |
| JP | 2000-292684 A | 10/2000 |
| JP | 2002-214518 A | 7/2002 |
| JP | 2005-181356 A | 7/2005 |
| JP | 2006-208783 A | 8/2006 |
| JP | 2011-090177 A | 5/2011 |

\* cited by examiner

*Primary Examiner* — Nicholas Giles
(74) *Attorney, Agent, or Firm* — Canon USA, Inc. IP Division

(57) ABSTRACT

An imaging apparatus includes a controller configured to perform focus control by adding a set value to a result of focus detection by automatic focusing based on a phase difference detection method. In a shooting mode, in a case where an AF frame to be used in the focus control is different from an AF frame to which the set value is set, the controller notifies a user of this fact.

14 Claims, 13 Drawing Sheets

IMAGING APPARATUS, METHOD FOR CONTROLLING IMAGING APPARATUS, AND PROGRAM

TECHNICAL FIELD

The present invention relates to an imaging apparatus having a plurality of focusing points for automatic focusing based on a phase difference detection method, a method for controlling the imaging apparatus, and a program.

BACKGROUND ART

Conventionally, in single-lens reflex cameras that achieve an in-focus state by phase difference automatic focusing (AF), during the course of use thereof over time, endurance of each of a lens and a camera main body has often led to a change in an in-focus position, thereby reducing focusing accuracy compared to the original condition immediately after the purchase of the camera. For the lens, although the lens is supposed to be driven to the correct in-focus position, its endurance may cause occurrence of a rattling movement, thereby shifting a lens stop position. For the camera main body, repeated mirror driving operations may result in a change in the mirror angle, thereby changing how light enters into an AF sensor to cause the AF sensor to recognize a position offset from the correct in-focus position as the in-focus position. An increasing number of recent imaging apparatuses have been equipped with a measure for returning the in-focus position to its original condition without requiring users to bring the cameras to service centers in this case.

Further, in-focus position detection based on phase difference AF may be unable to detect the correct in-focus position due to an influence of, for example, a light source at the time of shooting and a color or type of an object. A possible solution to occurrence of such a problem is to correct an in-focus position detected by phase difference AF according to an environment in which the camera is used. At this time, in a case where there is a plurality of focusing points for phase difference AF, for example, this may require a correction for each of the focusing points. However, each time a correction is required, a time should be taken to individually make a correction, and an increase in the number of points requiring corrections makes satisfaction with this requirement practically difficult. Therefore, it is desirable to a user to make a correction according to a focusing point that the user wants to use.

Japanese Patent Application Laid-Open No. 2000-292684 discusses a function capable of automatically correcting a focusing point of phase difference AF using a contrast detection method. A correction value can be stored for each focal length.

However, the above-described conventional technique discussed in Japanese Patent Application Laid-Open No. 2000-292684 is not configured in consideration of any measure against following problem. An imaging apparatus having a plurality of focusing points for phase difference AF may have such a problem that, when a user limits focusing points to be used in shooting after selecting a desired focusing point and calibrating phase difference AF, the limited focusing points do not include the focusing point used in the calibration.

CITATION LIST

Patent Literature

PTL 1: Japanese Patent Application Laid-Open No. 2000-292684

SUMMARY OF INVENTION

According to an aspect of the present invention, an imaging apparatus, which has a plurality of AF frames for automatic focusing based on a phase difference detection method, includes a memory configured to store a set value set in an adjustment mode. The set value corresponds to at least one AF frame among the plurality of AF frames. The imaging apparatus further includes a controller configured to perform focus control by adding the set value to a result of focus detection by the automatic focusing by the phase difference detection method. In a shooting mode, in a case where an AF frame to be used in the focus control is different from an AF frame to which the set value is set, the controller notifies a user of this fact.

According to exemplary embodiments of the present invention, it is possible to prevent the imaging apparatus from being placed in such a situation that, when the user limits focusing points to be used in shooting, the limited focusing points do not include a focusing point used in calibration with this situation unnoticed by the user.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
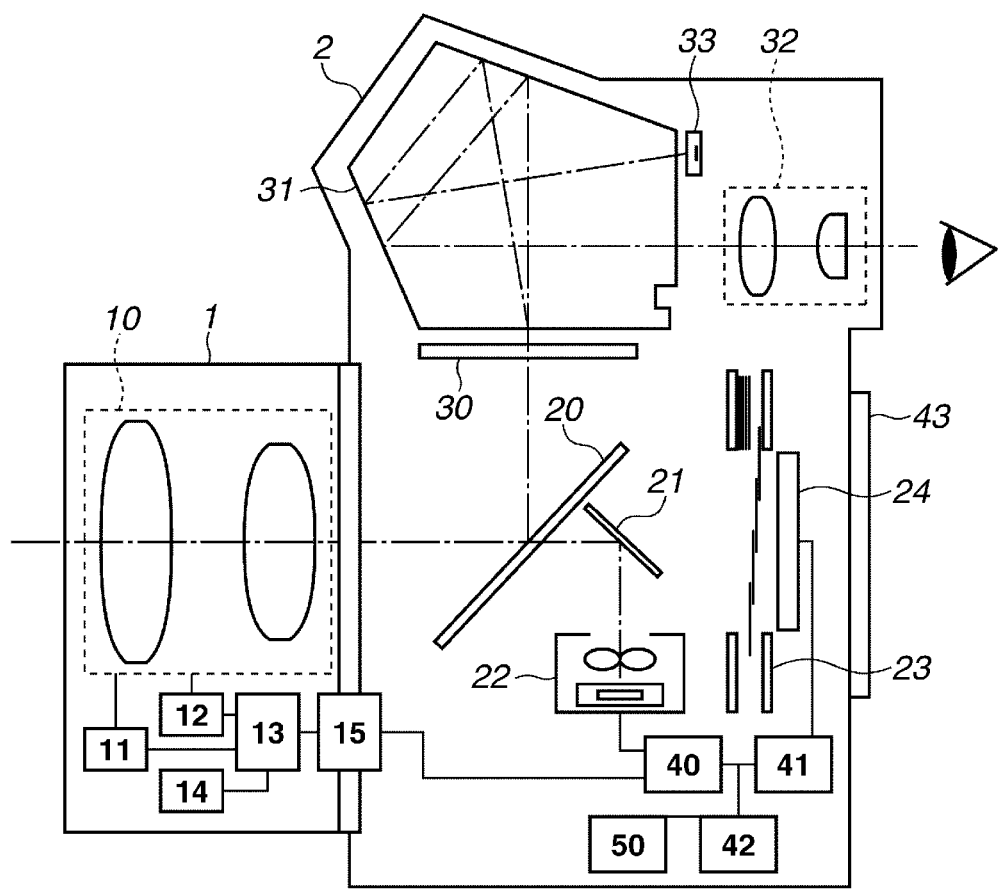
FIG. 1 is a schematic cross-sectional view illustrating an imaging apparatus according to a first exemplary embodiment.
Figure 2:
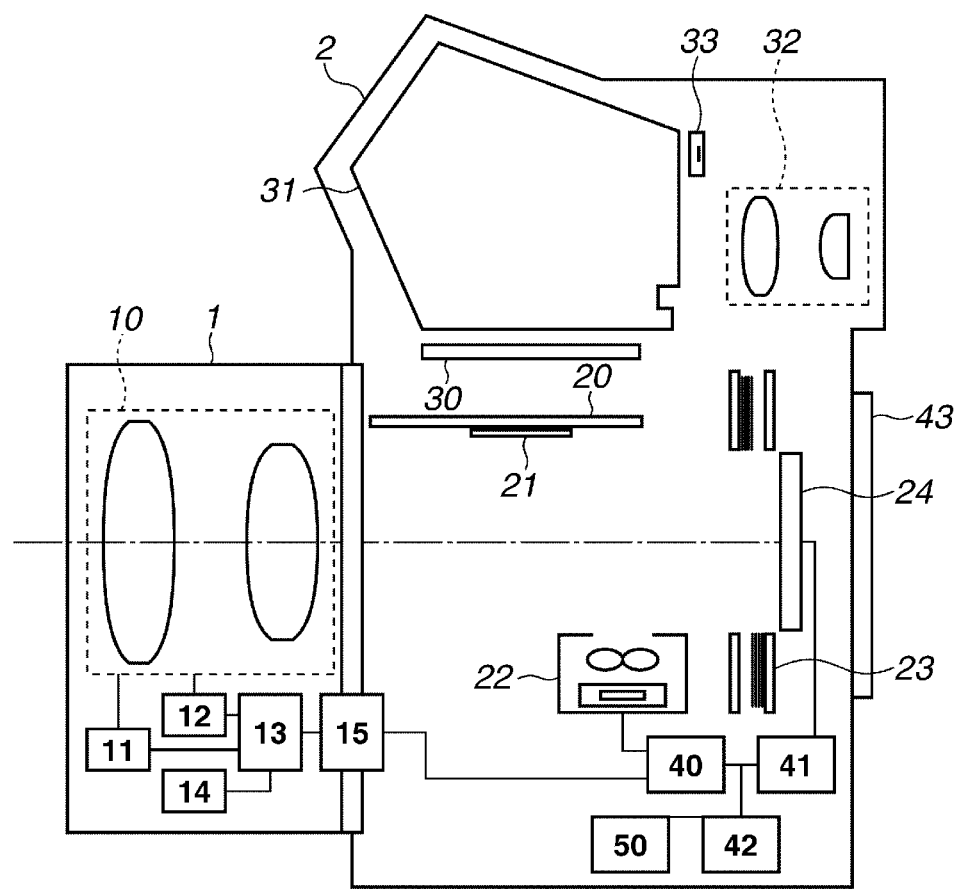
FIG. 2 is a schematic cross-sectional view illustrating the imaging apparatus according to the first exemplary embodiment at a mirror-up time.
Figure 3:
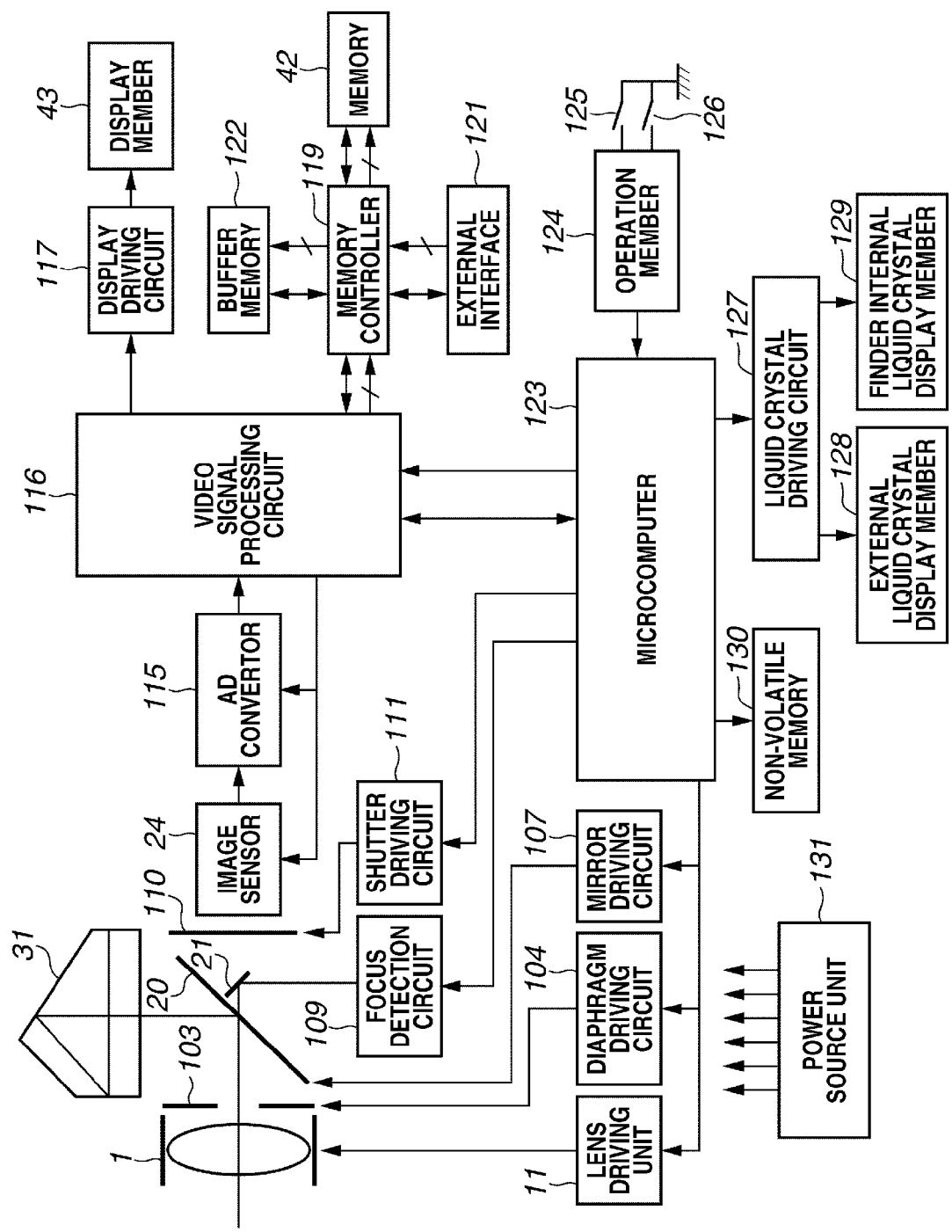
FIG. 3 is a block diagram illustrating a configuration of the imaging apparatus according to the first exemplary embodiment.

A first exemplary embodiment will be described. FIGS. 1 and 2 are schematic cross-sectional views illustrating an imaging apparatus according to the present exemplary embodiment. FIG. 3 is a block diagram illustrating a configuration of the imaging apparatus according to the present exemplary embodiment. The imaging apparatus includes a lens main body 1 and a camera main body 2. An imaging optical system 10 is contained in the lens main body 1, and includes a lens unit including a single lens or a plurality of lenses. A focal length and a focusing position can be changed by moving all or a part of the lenses.

A lens driving unit 11 moves all or a part of the lenses included in the imaging optical system 10 to adjust a focusing state. The lens driving unit 11 includes, for example, a direct-current (DC) motor or a stepping motor, and changes a position of a focusing lens contained in the lens main body 1 under control of a microcomputer 123 to achieve an in-focus state. A lens state detection unit 12 detects a focal length of the imaging optical system 10, i.e., a zooming position and a focusing position.

A lens control unit 13 is also contained in the lens main body 1. A lens storage unit 14 includes, for example, a read only memory (ROM). The lens control unit 13 controls the entire lens main body 1 including the lens storage unit 4. A contact 15 is provided to the lens main body 1 and the camera main body 2. The lens main body 1 and the camera main body 2 communicate various kinds of information and supply power via the contact 15 with them attached thereto.

A main mirror 20 and a sub mirror 21 are contained in the camera main body 2. The main mirror 20 is configured to be a half mirror, and to be rotatable according to an operation state of the camera. When a user observes an object via a finder, the main mirror 2 is disposed obliquely in a shooting optical path to bend a light flux from the lens main body 1 to guide the light flux to a finder optical system, which will be described below (refer to FIG. 1). On the other hand, at the time of shooting or a live view display, the main mirror 20 is retracted from the shooting optical path to guide a light flux from the lens main body 1 to an image sensor 24 (refer to FIG. 2). The sub mirror 21 is rotatable together with the main mirror 20. When the main mirror 20 is disposed obliquely in the shooting optical path, the sub mirror 21 bends a light flux transmitted through the main mirror 20 to guide the light flux to an AF sensor 22 (disposed in a focus detection circuit 109), which will be described below (refer to FIG. 1). On the other hand, at the time of shooting and a live view display, the sub mirror 21 rotates together with the main mirror 20 to be retracted from the shooting optical path (refer to FIG. 2).

The AF sensor 22 includes, for example, a secondary imaging lens and an area sensor including a plurality of charge coupled devices (CCDs) or complementary metal-oxide semiconductors (CMOSs). The AF sensor 22 can perform focus detection by the phase difference detection method, which is a known method. A focal plane shutter 23 is disposed to control an entry of the light flux from the lens main body 1 into the image sensor 24. In a normal state, the focal plane shutter 23 is closed (refer to FIG. 1). At the time of shooting or a live view display, the focal plane shutter 23 is opened (refer to FIG. 2). The image sensor 24 includes an image sensor and a peripheral circuit thereof. The image sensor 24 is embodied by, for example, an image sensor CCD or a CMOS sensor, and converts an object image formed by the lens main body 1 into an electric signal.

A focus plate 30 is disposed on a primary imaging plane of the lenses included in the imaging optical system 10. A Fresnel lens (a collective lens) is disposed on a light-receiving surface of the focus plate 30. An object image (a finder image) is formed on a light-emitting surface of the focus plate 30. A pentagonal prism 31 changes a finder optical path, and corrects the object image formed on the light-emitting surface of the focus plate 3 into an erect image. An eyepiece lens 32 is configured to be able to adjust diopter according to a user's eye when the user looks into the finder. An optical system including the focus plate 30, the pentagonal prism 31, and the eyepiece lens 32 will be referred to as "the finder optical system". An automatic exposure (AE) sensor 33 includes a photodiode corresponding to each region in an imaging region divided into multiple regions, and measures luminance of the object image formed on the light-emitting surface of the focus plate 30.

A mechanism control unit 40 includes the microcomputer 123, which controls the entire camera. A digital control unit 41 includes a memory controller (an integrated circuit unit (ICU)) in charge of various kinds of control of image data. The digital control unit 41 can perform focus detection by the contrast detection method, according to which contrast detection is performed on an image captured by the image sensor 24 to determine an in-focus position. A camera storage unit 42 includes a memory, and stores, for example, settings and adjustment data for enabling various kinds of control. The camera storage unit 42 may be detachable. A display member 43 includes a liquid crystal monitor using a thin-film transistor (TFT) or an organic electroluminescence (EL), and displays a captured image and various kinds of shooting information.

The imaging apparatus includes a diaphragm 103, and a diaphragm driving circuit 104 for driving the diaphragm 103. The microcomputer 123 calculates an amount by which the diaphragm 103 should be driven, and an optical diaphragm value is changed according thereto. A mirror driving circuit 107 drives the main mirror 20 under control of the microcomputer 123.

The imaging apparatus includes the focus detection circuit 109. A light flux transmitted through the central portion of the mirror 20 and reflected by the sub mirror 21 reaches the AF sensor 22, which is disposed inside the focus detection circuit 109 to photoelectrically convert the light. A defocus amount used in focus calculation is acquired by calculating an output of the AF sensor 22. The microcomputer 123 evaluates the calculation result to instruct the lens driving unit 11, thereby driving the focusing lens.

A shutter driving circuit 111 drives the focal plane shutter 23. The microcomputer 123 controls a time for which the shutter is opened. An analog/digital (A/D) convertor 115 converts an analog output signal from the image sensor 24 into a digital signal. A video signal processing circuit 116 is realized by a logic device such as a gate array. The imaging apparatus includes a display driving circuit 117. The imaging apparatus further includes a memory controller 119. An external interface 121 can be connected to, for example, a computer. The imaging apparatus further includes a buffer memory 122.

The video signal processing circuit 116 performs filtering processing, color conversion processing, and gamma processing on a digitized image signal to generate developed data, and performs compression processing such as Joint Photographic Experts Group (JPEG) thereon. The video signal processing circuit 116 outputs the thus-generated signal to the memory controller 119.

Further, the video signal processing circuit 116 can add two or more developed data pieces stored in the buffer memory 122 or generate high-precision data from developed data by increasing the number of bits for gradation, or perform the both kinds of processing at the same time, and then write back the result into the buffer memory 122. Further, the video signal processing circuit 116 can also output a video signal from the image sensor 24 and an image signal reversely input from the memory controller 119 to the display member 43 via the display driving circuit 117.

These functions are switched based on an instruction from the microcomputer 123. The video signal processing circuit 116 can output exposure information and information of, for example, white balance about a signal of the image sensor 24 to the microcomputer 123 as necessary. The microcomputer 123 issues an instruction for white balance and gain adjustment based on these kinds of information. During a continuous shooting operation, the microcomputer 123 once stores captured data into the buffer memory 122 as unprocessed image, reads out the unprocessed image data via the memory controller 119, and causes the video signal processing circuit 116 to perform image processing and compression processing thereon, thereby realizing continuous shooting. The number of pictures that can be taken by continuous shooting depends on the size of the buffer memory 122.

The memory controller 119 stores unprocessed digital image data input from the video signal processing circuit 116 into the buffer memory 122, and stores processed digital image data into the camera storage unit 42. Further, conversely, the memory controller 119 outputs image data from the buffer memory 122 or the camera storage unit 42 to the video signal processing circuit 116. The memory controller 119 can output an image stored in the camera storage unit 42 via the external interface 121 connectable to, for example, a computer.

The microcomputer 123 is a central processing unit (MPU). The imaging apparatus includes an operation member 124. The operation member 124 notifies the microcomputer 123 of the state of the operation member 124, and the microcomputer 123 controls the respective units according to a change in the state of the operation member 124. The imaging apparatus further includes a switch 1 (hereinafter referred to as "the SW1") 125, and a switch 2 (hereinafter referred to as "the SW2") 126. The SW1 (125) and the SW2 (126) are switches configured to be turned on or turned off by an operation of a release button, and each switch is one of input switches of the operation member 124. In a state where only the SW1 (125) is turned on, the release button is half pressed. In this state, the imaging apparatus performs an automatic focusing operation and a light metering operation. In a state where both the SW1 (125) and the SW2 (126) are turned on, the release button is fully pressed. This state is an ON state of the release button for recording an image. In this state, the imaging apparatus performs a shooting operation. Further, while the SW1 (125) and the SW2 (126) are maintained turned on, the imaging apparatus performs a continuous shooting operation.

Examples of other switches connected to the operation member 124 include, for example, a main switch, a card cover, a battery cover, a shooting mode dial, an International Standards Organization (ISO) setting button, a menu button, a set button, a flash setting button, a single shooting/continuous shooting/self-timer changeover button, a scroll + (plus) button and a scroll − (minus) button for scrolling menu items or reproduced images, an exposure correction button, a displayed image enlargement button, a displayed image reduction button, a reproduction switch, a diaphragm button for reducing the aperture of the diaphragm 103 to a set value, a deletion button for deleting a captured image, and a button for displaying information regarding shooting and reproduction, although they are not illustrated in the drawings. The operation member 124 detects the states of these switches. For the respective functions of the above-described plus button and minus button, providing a rotational dial switch enables an easier selection of a numerical value and a function.

The imaging apparatus further includes a liquid crystal driving circuit 127, an external liquid crystal display member 128, and a finder internal liquid crystal display member 129. The liquid crystal driving circuit 127 drives the external liquid crystal display member 128 and the finder internal liquid crystal display member 129, which display, for example, an operation state and a message using characters and an image, according to a display content command from the microcomputer 123. Further, a not-illustrated backlight such as a light emitting diode (LED) is disposed at the finder internal liquid crystal display member 129, and this LED is also driven by the liquid crystal driving circuit 127.

The microcomputer 123 can calculate the number of remaining images that can be shot based on estimated value data of an image size according to ISO sensitivity, an image size, and an image quality set before shooting, after confirming the capacity of the memory via the memory controller 119. The microcomputer 123 can also display the number of remaining images that can be shot on the external liquid crystal display member 128 and the finder internal liquid crystal display member 129 as necessary. A non-volatile memory 130 (electrically erasable programmable read only memory (EEPROM)) can hold data even while the camera is powered off. A power source unit 131 supplies a required power source to the respective integrated circuits (ICs) and driving systems.

Figure 4:
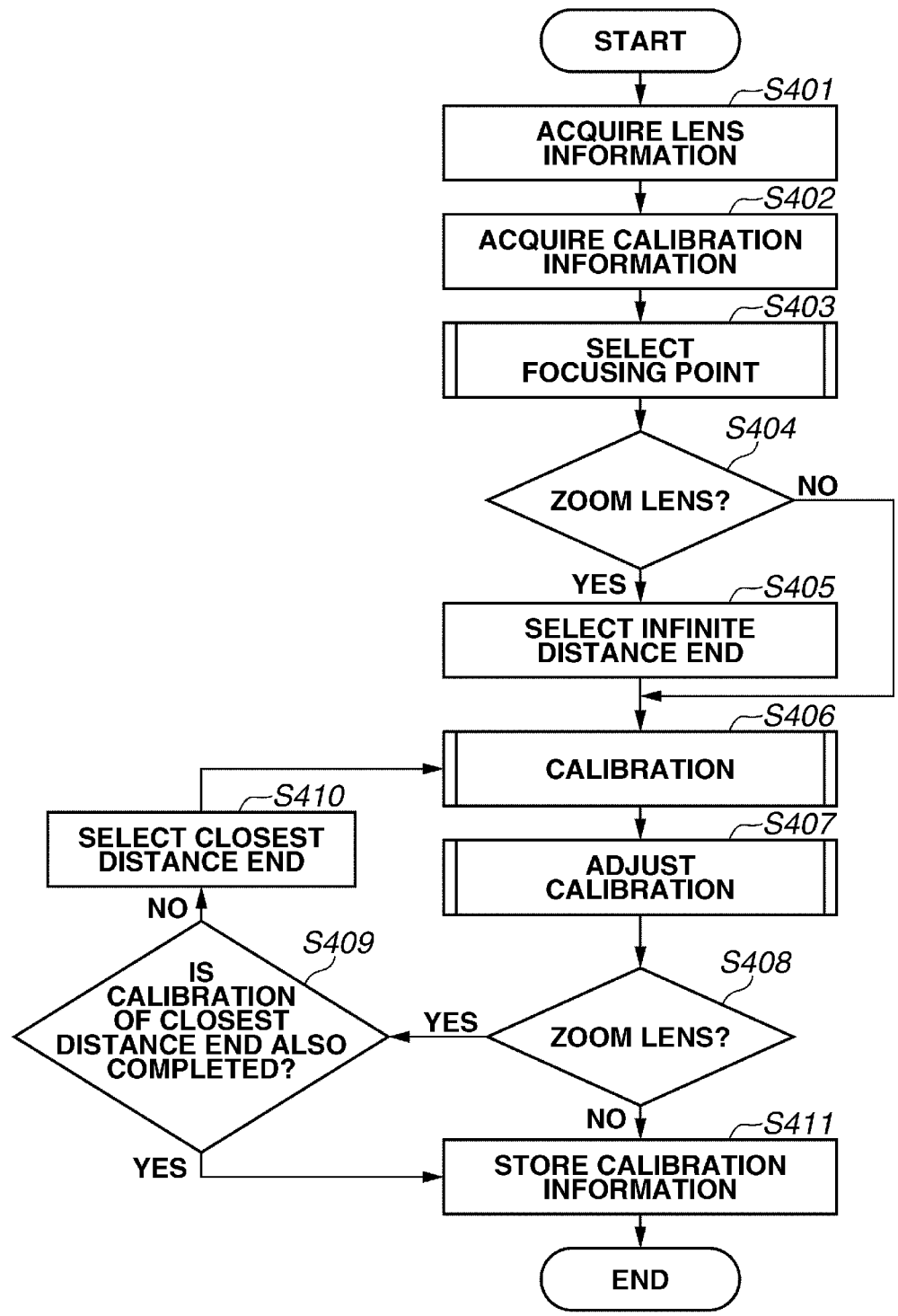
FIG. 4 is a flowchart illustrating calibration processing according to the first exemplary embodiment.

FIG. 4 is a flowchart illustrating an example of calibration processing for acquiring a correction value based on a result of focus detection by automatic focusing based on the phase difference detection method (hereinafter referred to as "phase difference AF"), and a result of focus detection by another method, with respect to a focusing point selected by a user. Now, this processing will be described with reference to the flowchart illustrated in FIG. 4. The mechanism control unit 40 executes a calibration program stored in the camera storage unit 42, by which this processing is realized.

In step S401, the mechanism control unit 40 acquires lens information by communication between the lens main body 1 and the camera main body 2. Then, the processing proceeds to step S402. The lens information includes a lens identification (ID), a lens name, and a serial number. In the present example, the mechanism control unit 40 acquires the lens information by communication between the lens main body 1 and the camera main body 2, but the mechanism control unit 40 may use lens information acquired from previous communication and stored in the camera storage unit 42 in advance.

In step S402, the mechanism control unit 40 acquires calibration information corresponding to the lens information acquired in step S401, from the camera storage unit 42. Then, the processing proceeds to step S403. At this time, in a case where there is no calibration information corresponding to the lens information, the lens main body 1 mounted on the camera main body 2 is regarded as a lens for which calibration is newly performed.

In step S403, the mechanism control unit 40 causes a user to select a focusing point for which calibration is performed.

Figure 8A:
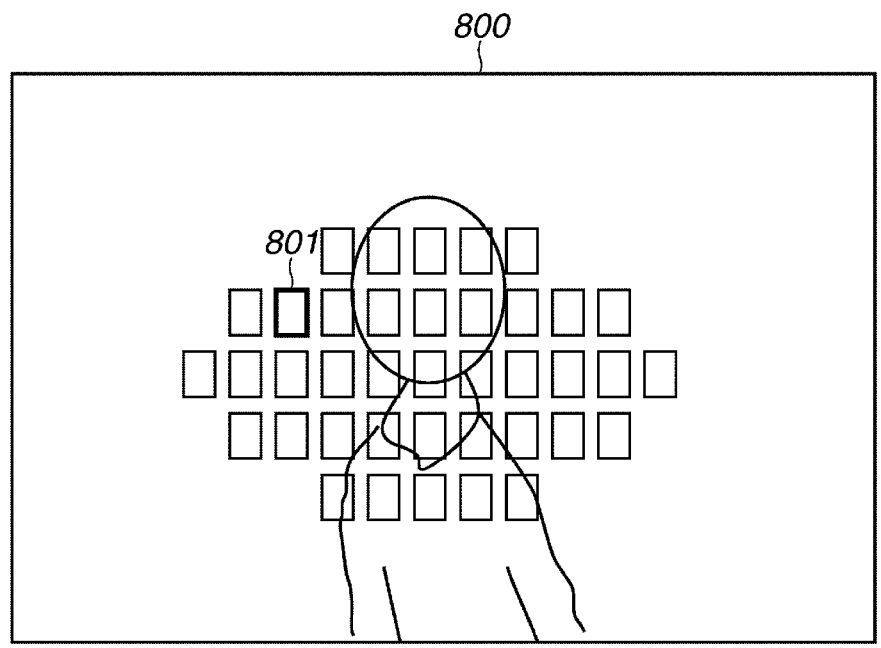
FIG. 8A illustrates an example of a screen according to the first exemplary embodiment.

Then, the processing proceeds to step S404. FIG. 8A illustrates an example of a screen 800 on which the user selects a focusing point in step S403. Only a focusing point 801 is illustrated in a different manner, and this focusing point 801 is the selected focusing point.

In step S404, the mechanism control unit 40 determines whether the lens main body 1 mounted on the camera main body 2 is a zoom lens or a single focus lens. If the mechanism control unit 40 determines in step S404 that the lens main body 1 is a zoom lens (YES in step S404), the processing proceeds to step S405. If the mechanism control unit 40 determines in step S404 that the lens main body 1 is a single focus lens (NO in step S404), the processing proceeds to step S406.

In step S405, the mechanism control unit 40 causes an infinite distance end to be selected. The infinite distance end can be selected in the following manner In a case where zooming processing can be performed by a command from the camera, a command for selecting the infinite distance end is issued by communication between the camera main body 2 and the lens main body 1, thereby automatically driving the lens. In a case where the camera only allows manual zooming processing, the mechanism control unit 40 displays a screen prompting a user to select the infinite distance end manually, thereby causing the user to manually drive the lens to select the infinite distance end. After the process of step S405 is completed, the processing proceeds to step S406.

In step S406, the mechanism control unit 40 performs calibration. The calibration in step S406 will be described below with reference to FIGS. 9, 10, and 11. In step S407, the mechanism control unit 40 causes the user to adjust calibration based on the calibration result calculated in step S406. In a case where the calculation result is satisfactory, the user does not have to make fine adjustment. After the process of step S407 is completed, the processing proceeds to step S408.

In step S408, the mechanism control unit 40 determines whether the lens main body 1 mounted on the camera main body 2 is a zoom lens or a single focus lens. The mechanism control unit 40 makes the determination in a similar manner to step S404. If the mechanism control unit 40 determines in step S408 that the lens main body 1 is a zoom lens (YES in step S408), the processing proceeds to step S409. If the mechanism control unit 40 determines in step S408 that the lens main body 1 is a single focus lens (NO in step S408), the processing proceeds to step S411. In step S409, the mechanism control unit 40 determines whether calibration of a closest distance end has been also performed. If the calibration of the closest distance end has been also performed (YES in step S409), the processing proceeds to step S411. If the calibration of the closest distance end has not been performed yet (NO in step S409), the processing proceeds to step S410. In step S410, the mechanism control unit 40 causes the closest distance end to be selected. The mechanism control unit 40 performs a process similar to the process in which the mechanism control unit 40 causes the infinite distance end to be selected in step S405. After the process of step S410 is completed, the processing proceeds to step S406.

In step S411, the mechanism control unit 40 stores the calibration result acquired from the processes of steps S406 and S407 into the camera storage unit 42. In the present exemplary embodiment, the mechanism control unit 40 first performs the process for the selection of the infinite distance end in step S405, and after that, the mechanism control unit 40 performs the process for the selection of the closest distance end in step S410. However, when the present exemplary embodiment is actually carried out, either process may be performed first. Further, the mechanism control unit 40 stores the calibration result into the camera storage unit 42 after acquiring both the result of the calibration of the infinite distance end and the result of the calibration of the closest distance end. However, when the present exemplary embodiment is actually carried out, the mechanism control unit 40 may store the calibration result into the camera storage unit 42 after acquiring only one of the calibration results.

Figure 5:
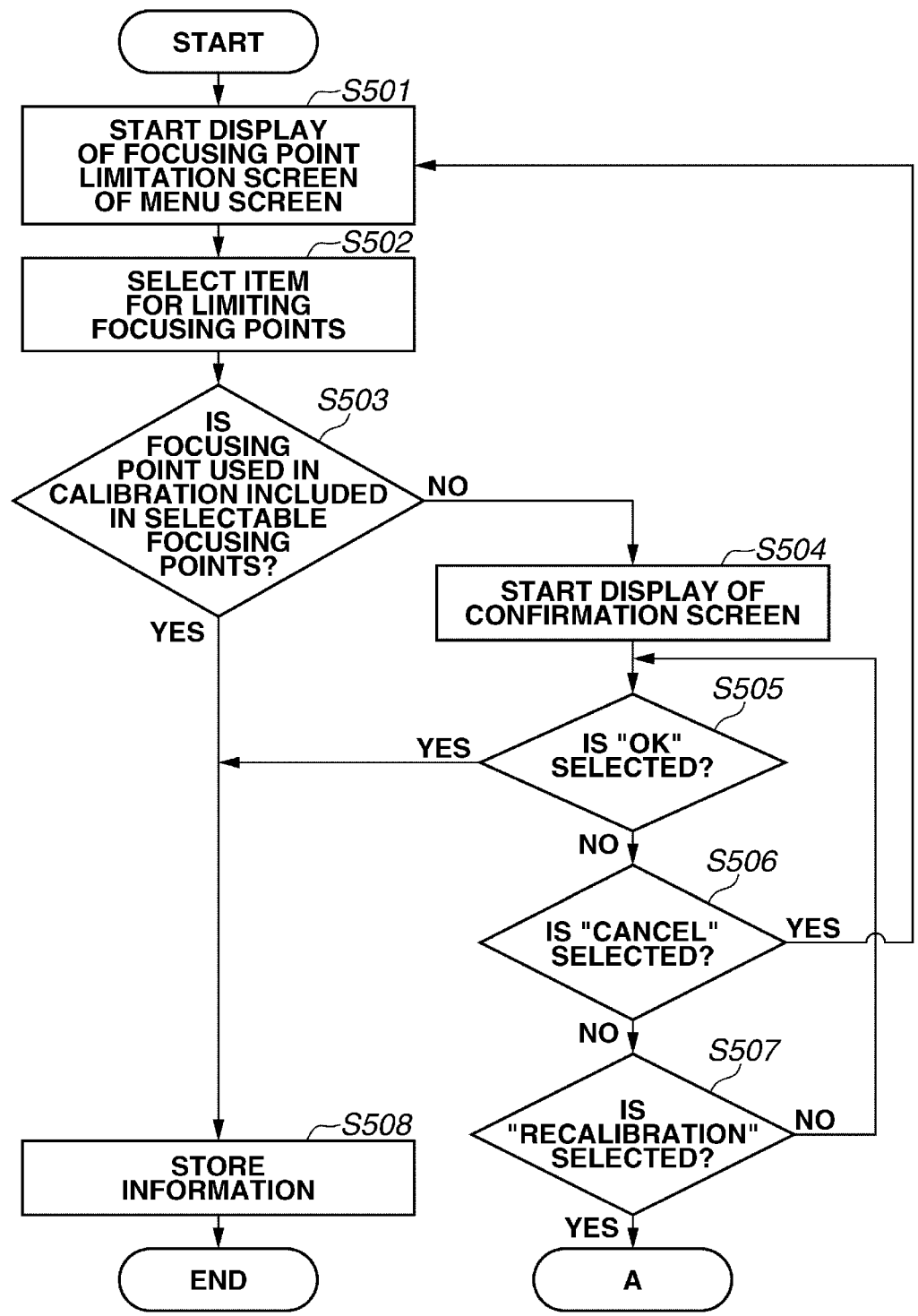
FIG. 5 is a flowchart illustrating processing for limiting focusing points according to the first exemplary embodiment.
Figure 6A:
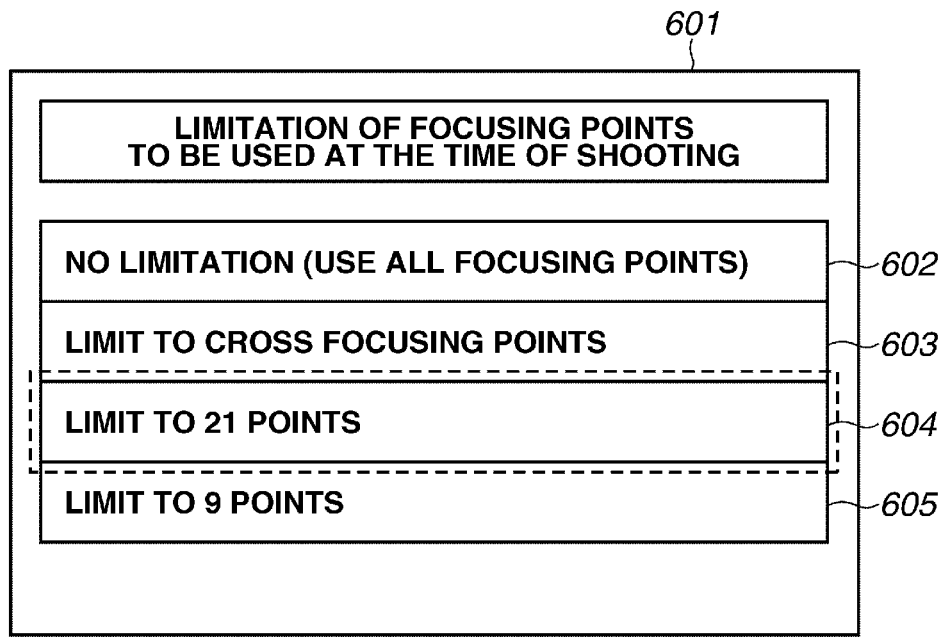
FIG. 6A illustrates an example of a screen according to the first exemplary embodiment.

Next, an example of processing for limiting focusing points to be used in shooting will be described with reference to the flowchart illustrated in FIG. 5 and examples of screens illustrated in FIGS. 6A and 6B. The function of limiting focusing points is a function provided to a camera having a large number of focusing points for phase difference AF to be used in shooting. For example, if a camera has 45 focusing points, it may be difficult for a user to immediately select a frequently used focusing point at the time of shooting. Therefore, execution of the processing for limiting focusing points allows a user to quickly select a frequently used focusing point at the time of shooting. The microcomputer 123 executes a program for the processing for limiting focusing points, which is stored in the camera storage unit 42, and causes the display member 43 to perform display, and thus this processing is realized.

In step S501, the microcomputer 123 displays a focusing point limitation screen of a setting screen on a menu, on the display member 43. FIG. 6A illustrates an example of a focusing point limitation screen 601. The focusing point limitation screen 601 displays and provides a plurality of items for limiting focusing points (focusing point limitation ranges).

In step S502, the microcomputer 123 causes a user to select an item for limiting focusing points. The limitation items include, for example, items 602 to 605 illustrated in FIG. 6A. The items illustrated in FIG. 6A are a mere example, and the limitation items may be any items capable of limiting focusing points. The item 602 "NO LIMITATION (USE ALL FOCUSING POINTS)" indicates that focusing points are not limited, and all focusing points are used in shooting. The item 603 "LIMIT TO CROSS FOCUSING POINTS" indicates limitation only to focusing points for which a cross sensor is used. The item 604 "LIMIT TO 21 POINTS" indicates limitation only to 21 points among a plurality of focusing points. The item 605 "LIMIT TO 9 POINTS" indicates limitation only to 9 points among a plurality of focusing points. After the microcomputer 123 causes the user to select a limitation item in step S502, the processing proceeds to step S503.

In step S503, the microcomputer 123 determines whether the focusing point selected in step S403 and used in the calibration (hereinafter referred to as "the selected focusing point") is not excluded from the limitation item selected and specified by the user in step S502. If the microcomputer 123 determines that the selected focusing point is not excluded from the limitation item (YES in step S503), the processing proceeds to step S508. If the microcomputer 123 determines that the selected focusing point is excluded from the limitation item (NO in step S503), the processing proceeds to step S504.

In step S508, the microcomputer 123 stores information of the limitation item selected and specified in step S502 into the camera storage unit 42.

Figure 6B:
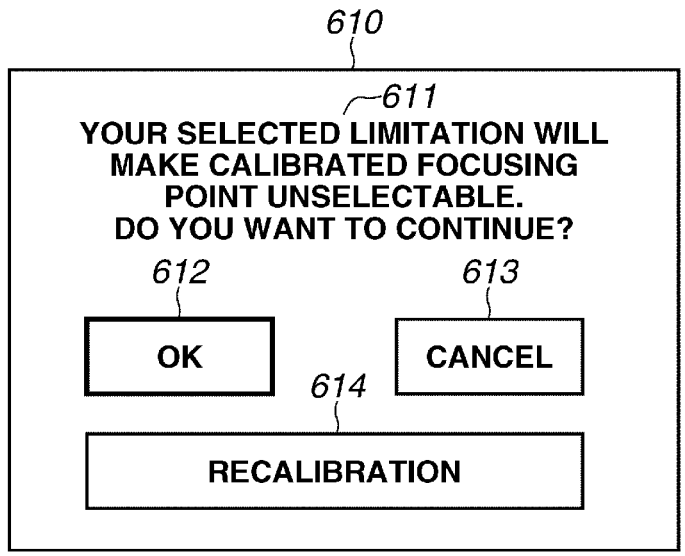
FIG. 6B illustrates an example of a screen according to the first exemplary embodiment.

In step S504, the microcomputer 123 displays a confirmation screen 610 illustrated in FIG. 6B, by which the microcomputer 123 prompts the user to select subsequent processing, on the display member 43. The confirmation screen 610 includes a description 611. An "OK" button 612 is an option for prompting the user to accept that the selected focusing point cannot be used at the time of shooting. A "CANCEL" button 613 is an option for allowing the user to cancel the processing for limiting focusing points. A "RECALIBRATION" button 614 is an option for allowing the user to perform calibration again.

In step S505, the microcomputer 123 determines whether the "OK" button 612 is selected. If the "OK" button 612 is selected (YES in step S505), the processing proceeds to step S508. If the "OK" button 612 is not selected (NO in step S505), the processing proceeds to step S506. If the "OK" button 612 is selected (YES in step S505), the microcomputer 123 may perform an AF operation using the correction value calculated by the calibration without any change made thereto, or may perform an AF operation without using the correction value.

In step S506, the microcomputer 123 determines whether the "CANCEL" button 613 is selected. If the "CANCEL" button 613 is selected (YES in step S506), the processing proceeds to step S501 again. If the "CANCEL" button 613 is not selected (NO in step S506), the processing proceeds to step S507. In step S507, the microcomputer 123 determines whether the "RECALIBRATION" button 614 is selected. If the "RECALIBRATION" button 614 is selected (YES in step S507), the processing proceeds to step S701 illustrated in FIG. 7. If the "RECALIBRATION" button 614 is not selected (NO in step S507), the processing proceeds to step S505 again.

Figure 7:
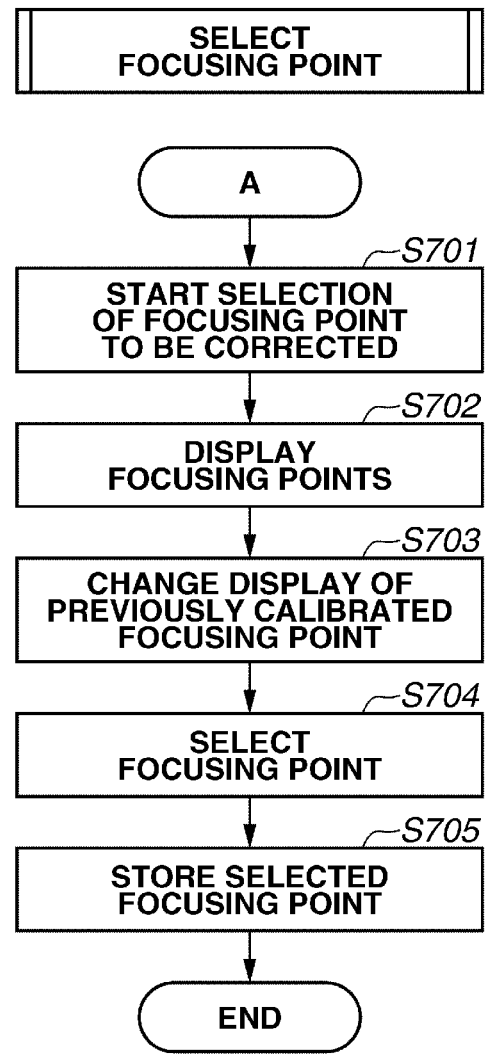
FIG. 7 is a flowchart illustrating a selection of a focusing point according to the first exemplary embodiment.
Figure 8B:
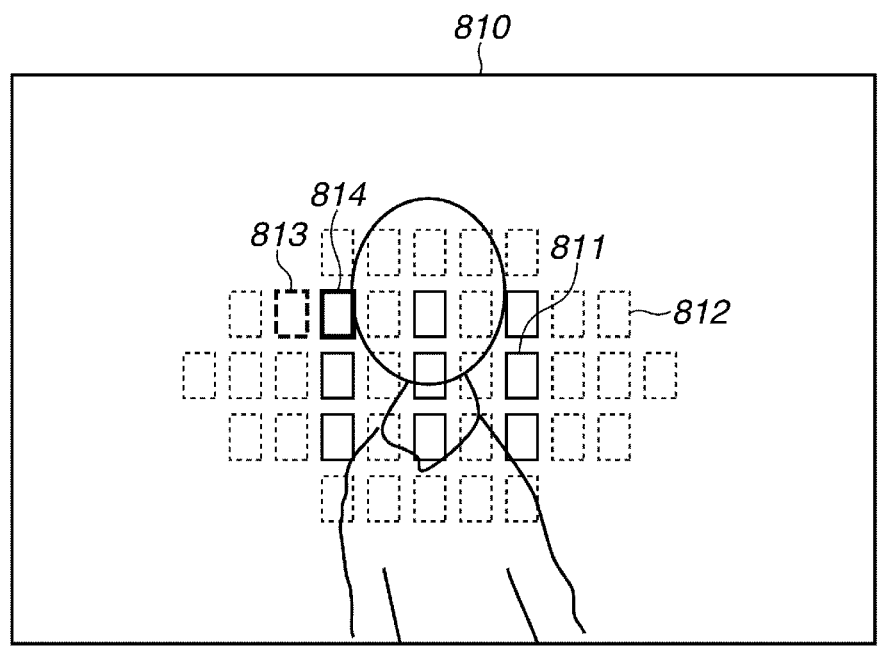
FIG. 8B illustrates an example of a screen according to the first exemplary embodiment.

Next, processing when the "RECALIBRATION" button 614 is selected in step S507 will be described with reference to the flowchart illustrated in FIG. 7 and an example of a screen illustrated in FIG. 8B. In step S701, the microcomputer 123 starts a selection of a focusing point to be used in calibration.

In step S702, the microcomputer 123 displays focusing points on the display member 43. FIG. 8B illustrates an example of a screen 810 at this time. The microcomputer 123 distinctively displays focusing points limited in step S502 (focusing points to be used in shooting) and focusing points excluded from the limitation item (focusing points to be unused in shooting). For example, the limited focusing points are expressed by solid lines, like a focusing point 811. The focusing points excluded from the limitation item are expressed by broken lines, like a focusing point 812. This display is a mere example, and the focusing points may be displayed in any manner, as long as a user can distinguish a difference between the both.

In step S703, the microcomputer 123 displays the focusing point for which calibration was performed previously in a different manner. For example, the previously calibrated focusing point is expressed by a thick frame of a broken line, like a focusing point 813 illustrated in FIG. 8B. This display is a mere example, and the previously calibrated focusing point may be displayed in any manner, as long as a user can distinguish a difference from other focusing points.

In step S704, the microcomputer 123 causes the user to select a focusing point for which calibration is performed. If the user frequently uses a certain focusing point at the time of shooting, it is highly likely that the user can acquire a more highly accurate result by selecting the focusing point corresponding to the certain focusing point that the user frequently uses and performing calibration based thereon. As a result of the process of step S702, the focusing points to be used in shooting become distinguishable from the focusing points to be unused in shooting, so the user can quickly select a focusing point for which calibration is performed without hesitation. The selected focusing point is displayed like a focusing point 814, and is displayed innovatively so as to be distinguishable from the unselected focusing point 811.

In step S705, once the user determines to perform calibration based on the selected focusing point, the microcomputer 123 stores information of the selected focusing point into the camera storage unit 42.

Figure 9:
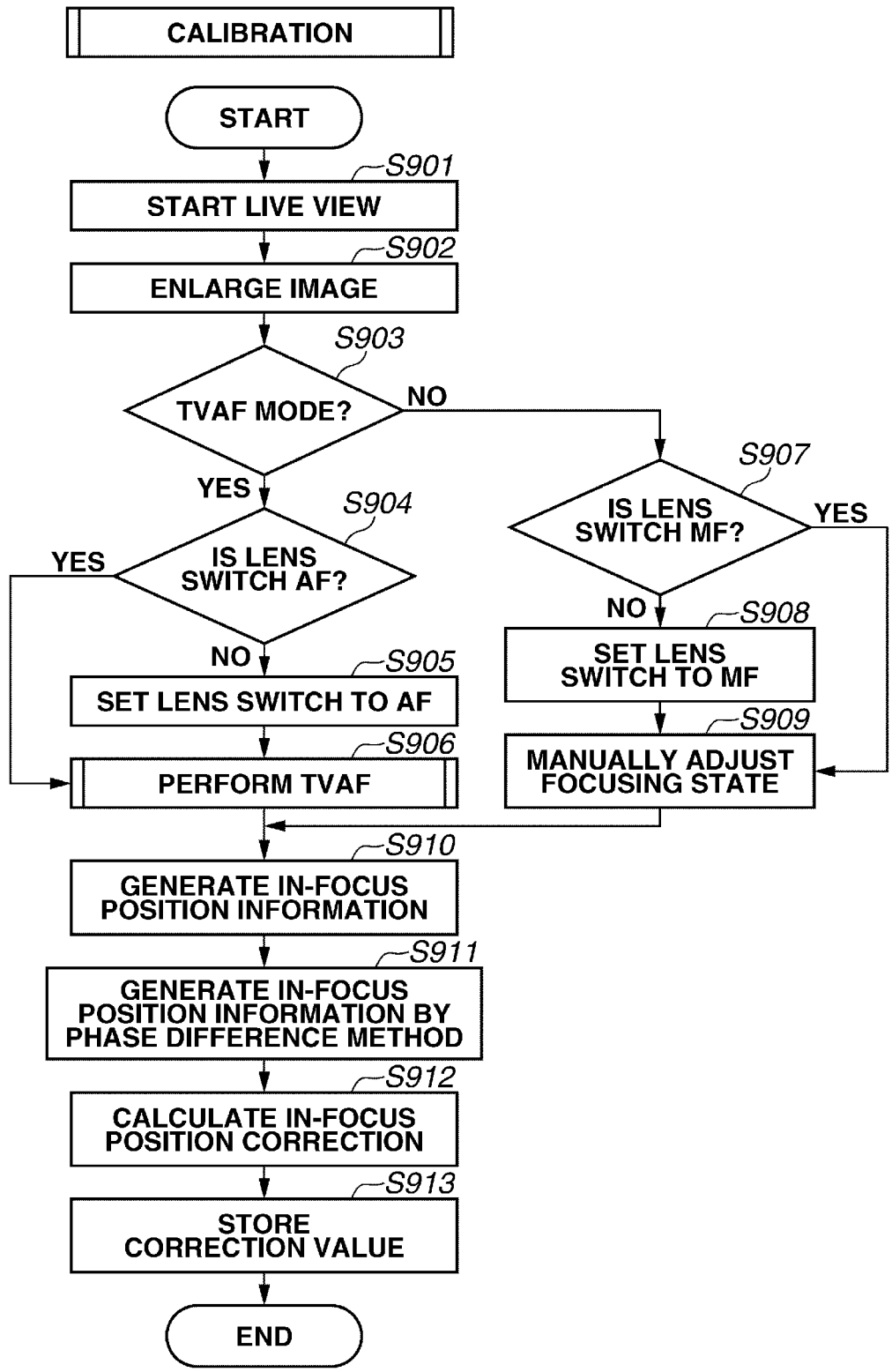
FIG. 9 is a flowchart illustrating details of calibration.
Figure 10:
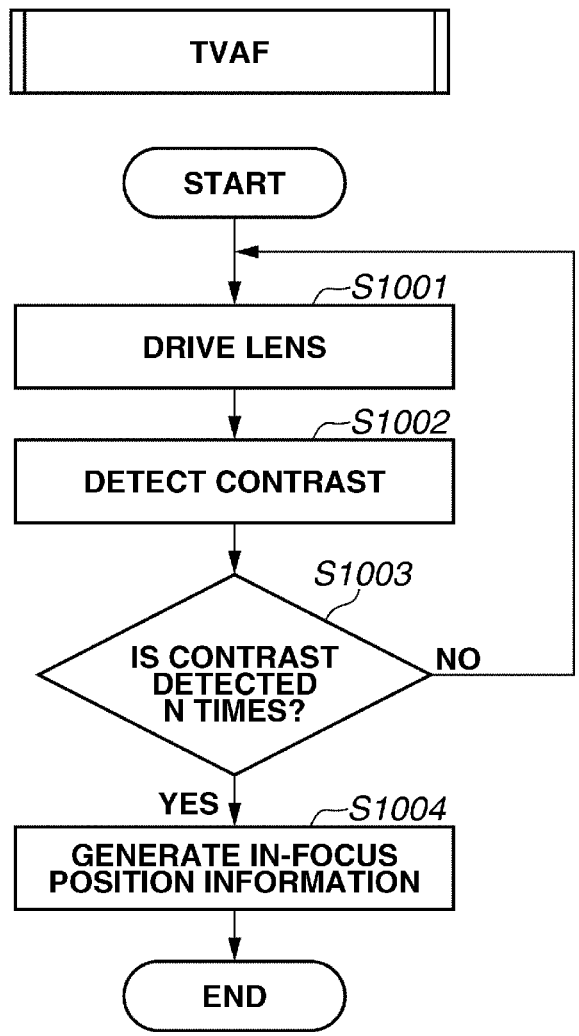
FIG. 10 is a flowchart illustrating details of contrast detection automatic focusing (TVAF).
Figure 11:
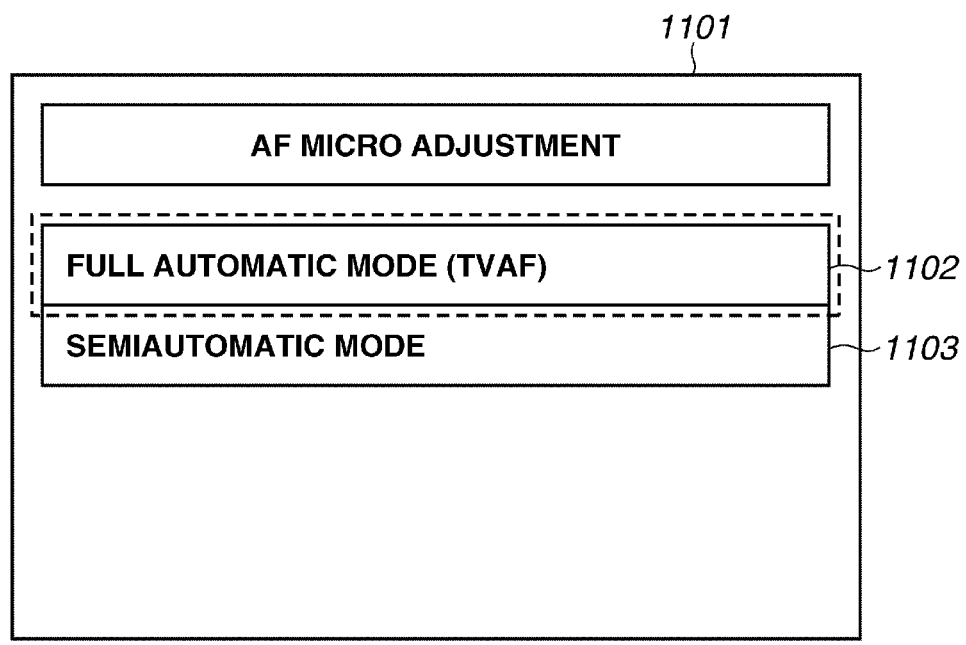
FIG. 11 illustrates an example of a screen according to the first exemplary embodiment.

Next, the calibration in step S406 illustrated in FIG. 4 will be described in detail with reference to the flowcharts illustrated in FIGS. 9 and 10 and an example of a screen illustrated in FIG. 11. Before starting this flow, an object to be shot should be determined. After an object is determined, the calibration is started.

In step S901, the mechanism control unit 40 starts a live view. In step S902, the mechanism control unit 40 enlarges an image displayed on the live view. The image does not necessarily have to be enlarged, but enlarging the image enables more accurate execution of an AF operation by the contrast detection method in step S906 or adjustment of a focusing state by a manual operation in step S909.

In step S903, the mechanism control unit 40 determines whether, in focus adjustment using the live view, the camera is set to a contrast detection method AF (TVAF) mode or the camera is set to a mode in which a user manually performs focus adjustment. The contrast detection method AF mode and the mode in which a user manually performs focus adjustment are set on a menu screen illustrated in FIG. 11. FIG. 11 illustrates a setting screen 1101. An item 1102 "FULL AUTOMATIC MODE (TVAF)" indicates use of contrast detection method AF (hereinafter referred to as "TVAF") for calibration. An item 1103 "SEMIAUTOMATIC MODE" indicates that a user manually performs focus adjustment for calibration (hereinafter referred to as "manual focusing (MA)"). If the microcomputer 123 determines that TVAF is selected (YES in step S903), the processing proceeds to step S904. If the microcomputer 123 determines that MF is selected (NO in step S903), the processing proceeds to step S907.

In step S904, the mechanism control unit 40 acquires the lens information by communication between the lens main body 1 and the camera main body 2. The lens information is information of a lens switch. In the present example, the mechanism control unit 40 acquires the lens information by communication between the lens main body 1 and the camera main body 2, but the mechanism control unit 40 may use lens information acquired from previous communication and stored in the camera storage unit 42 in advance. The mechanism control unit 40 determines whether the lens switch is positioned at AF or the lens switch is positioned at MF based on the acquired lens information. If the lens switch is positioned at AF (YES in step S904), the processing proceeds to step S906. If the lens switch is positioned at MF (NO in step S904), in step S905, the lens switch is set to AF. After that, the processing proceeds to step S906. Setting the lens switch may be realized by an automatic operation by the camera or a manual operation by the user. In a case where the user is supposed to set the lens switch to AF, the mechanism control unit 40 displays a message prompting the user to set the lens switch to AF on the display member 43.

In step S906, the mechanism control unit 40 performs TVAF. The TVAF process in step S906 will be described below with reference to FIG. 10. After TVAF is performed in step S906, the processing proceeds to step S910.

In step S907, the mechanism control unit 40 acquires the lens information by communication between the lens main body 1 and the camera main body 2. The lens information is information of the lens switch. In the present example, the mechanism control unit 40 acquires the lens information by communication between the lens main body 1 and the camera main body 2, but the mechanism control unit 40 may use lens information acquired from previous communication and stored in the camera storage unit 42 in advance. The mechanism control unit 40 determines whether the lens switch is positioned at AF or the lens switch is positioned at MF based on the acquired lens information. If the lens switch is positioned at MF (YES in step S907), the processing proceeds to step S909. If the lens switch is positioned at AF (NO in step S907), in step S908, the lens switch is set to MF. After that, the processing proceeds to step S909. Setting the lens switch may be realized by an automatic operation by the camera or a manual operation by the user. In a case where the user is supposed to set the lens switch to MF, the mechanism control unit 40 displays a message prompting the user to set the lens switch to MF on the display member 43.

In step S909, the user performs focus adjustment on the live view by rotating a focusing ring of the lens. Since the image is enlarged in step S902, the user can more easily and accurately perform the focus adjustment operation. After the user performs focus adjustment manually in step S909, the processing proceeds to step S910.

In step S910, the mechanism control unit 40 acquires position information at that time from the lens state detection unit 12 via the lens control unit 13 to generate in-focus position information. In step S911, the mechanism control unit 40 causes the AF sensor 22 to perform focus detection by phase difference AF. Then, the mechanism control unit 40 converts the detection result at that time, i.e., a defocus amount into a driving amount of the focusing lens in an in-focus direction. The mechanism control unit 40 adds the converted value to the focus position information from the lens state detection unit 12 to generate in-focus position information. After that, the processing proceeds to step S912. In step S912, the mechanism control unit 40 causes the digital control unit 41 to calculate an in-focus position correction value, which is a difference between the in-focus position information when the digital control unit 41 determines an in-focus state, and the in-focus position information acquired from the detection result of the AF sensor 22. Then, the processing proceeds to step S913. In step S913, the mechanism control unit 40 stores the in-focus position correction value calculated by the digital control unit 41 into the camera storage unit 42. Then, the processing is ended.

Next, TVAF in step S906 illustrated in FIG. 9 will be described in detail with reference to the flowchart illustrated in FIG. 10. In step S1001, the mechanism control unit 40 transmits a signal to the lens control unit 13, and moves the focusing lens to a predetermined position via the lens driving unit 11. Then, the processing proceeds to step S1002. In step S1002, the mechanism control unit 40 causes the digital control unit 41 to detect contrast of an image signal acquired from the image sensor 24. Then, the processing proceeds to step S1003.

In step S1003, the mechanism control unit 40 causes a minute movement of the focusing lens in step S1001 and the contrast detection in step S1002 to be repeatedly performed until the number of times of repetition reaches a predetermined number N. If the number of times of repetition reaches the predetermined number N (YES in step S1003), the processing proceeds to step S1004. If the number of times of repetition does not reach the predetermined number N (NO in step S1003), the processing proceeds to step S1001 again. In step S1004, the digital control unit 41 determines a focusing position where the digital control unit 41 can acquire an image signal of the highest contrast among the N contrast detection results, as an in-focus position, and then transmits a signal to the mechanism control unit 40. The mechanism control unit 40 acquires the position information at that time from the lens state detection unit 12 via the lens control unit 13 to generate the in-focus position information.

According to the above-described first exemplary embodiment, in a case where the selected focusing point is excluded from the focusing point limitation range which indicates focusing points to be used in shooting, the confirmation screen is displayed to notify a user of this fact (step S504). As a result, it is possible to prevent the selected focusing point from being excluded from the limited focusing points with this situation unnoticed by the user. Further, the first exemplary embodiment prepares the flow for recalibration by the processes of steps S701 to S705 illustrated in FIG. 7, thereby allowing a user to easily and smoothly set the camera conditions. Therefore, it is possible to prevent AF from being performed with an incorrect correction value.

Figure 12:
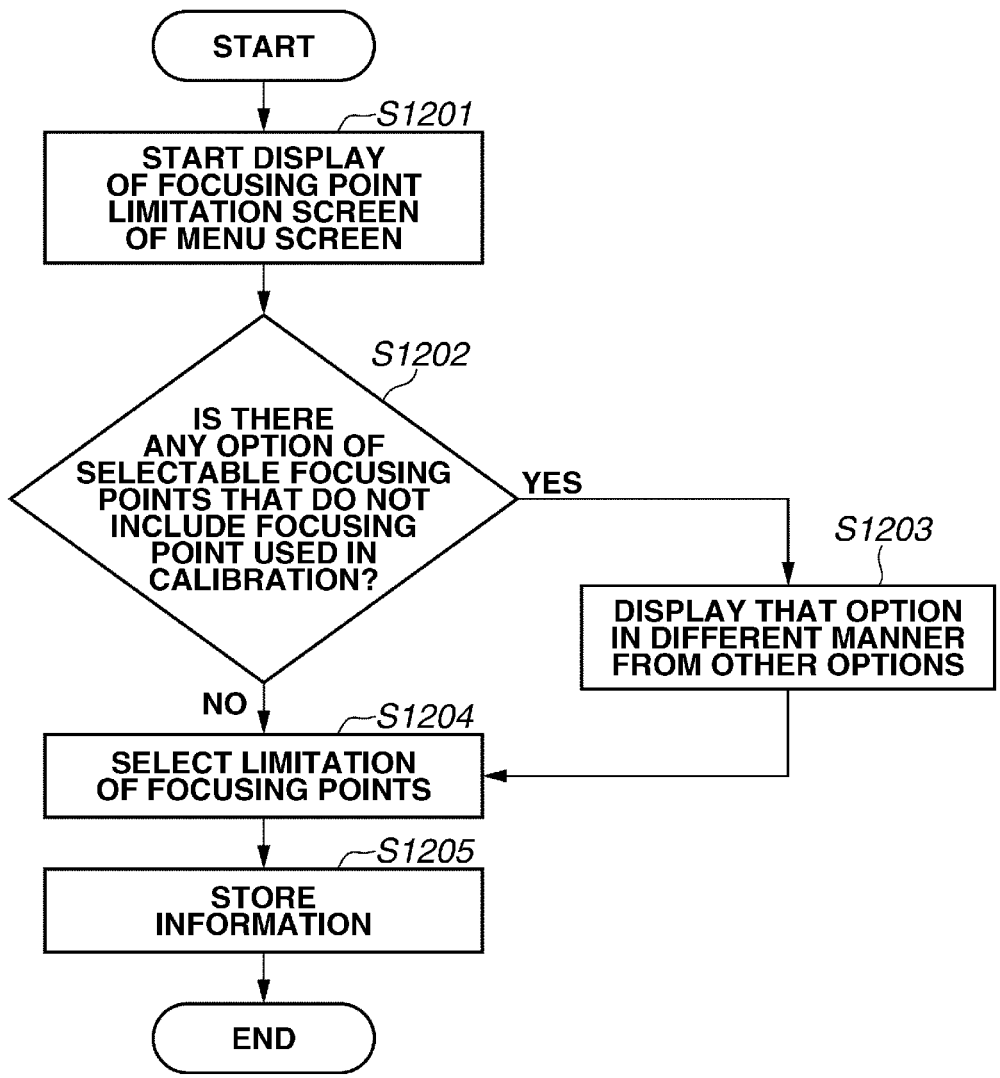
FIG. 12 is a flowchart illustrating processing for limiting focusing points according to a second exemplary embodiment.

Next, a second exemplary embodiment will be described. The second exemplary embodiment is different from the first exemplary embodiment in terms of the processing for limiting focusing points to be used in shooting. The second exemplary embodiment will be described below, mainly focusing on its difference from the first exemplary embodiment. An example of the processing for limiting focusing points to be used in shooting will be described with reference to the flowchart illustrated in FIG. 12 and an example of a screen illustrated in FIG. 13. The microcomputer 123 executes a program for the processing for limiting focusing points, which is stored in the camera storage unit 42, and causes the display member 43 to perform display, and thus this processing is realized.

In step S1201, the microcomputer 123 displays a focusing point limitation screen of a setting screen on a menu, on the display member 43. In the present exemplary embodiment, this screen also has the limitation items, "NO LIMITATION (USE ALL FOCUSING POINTS)", "LIMIT TO CROSS FOCUSING POINTS", "LIMIT TO 21 POINTS", and "LIMIT TO 9 POINTS", in a similar manner to the first exemplary embodiment.

In step S1202, the microcomputer 123 determines whether there is any limitation item from which the focusing point (the selected focusing point) selected in step S403 and used in calibration is excluded. For example, in a case where the selected focusing point is the focusing point 813 illustrated in FIG. 8B, this focusing point 813 is not included in the limitation item "LIMIT TO 9 POINTS". Therefore, in step S1202, the microcomputer 123 determines that there is a limitation item from which the selected focusing point is excluded. If the microcomputer 123 determines in step S1202 that there is a limitation item from which the selected focusing point is excluded (YES in step S1202), the processing proceeds to step S1203. If there is no limitation item from which the selected focusing point is excluded (NO in step S1202), the processing proceeds to step S1204.

Figure 13:
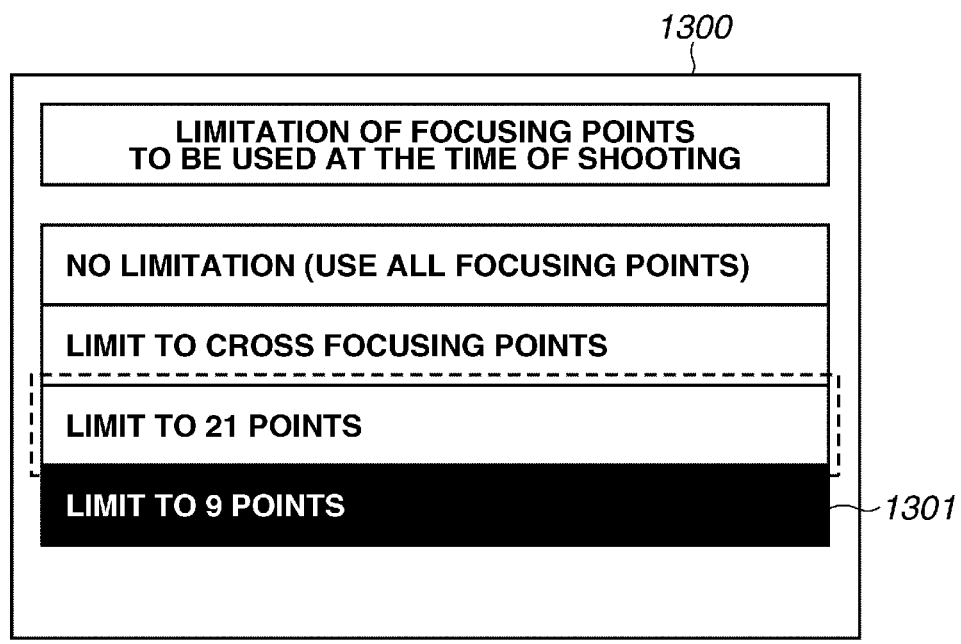
FIG. 13 illustrates an example of a screen according to the second exemplary embodiment.

In step S1203, the microcomputer 123 distinctively displays a limitation item from which the selected focusing point is excluded and a limitation item from which the selected focusing point is not excluded so that they are distinguishable from each other. For example, in the exemplary screen illustrated in FIG. 13, the limitation item 1301 "LIMIT TO 9 POINTS", from which the selected focusing point is excluded, is highlighted in reversed black and white, and is configured so as not to allow a user to specify it. The display illustrated in FIG. 13 is a mere example, and such a limitation item may be displayed in any manner, as long as a user can recognize it.

In step S1204, the microcomputer 123 causes the user to select an item for limiting focusing points. In step S1205, the microcomputer 123 stores information of the limitation item selected and specified in step S1204 in the camera storage unit 42.

According to the above-described second exemplary embodiment, the microcomputer 123 distinctively displays the limitation item from which the selected focusing point is excluded and the limitation item from which the selected focusing point is not excluded (steps S1202 and S1203). As a result, it is possible to prevent the selected focusing point from being excluded from the limited focusing points with this situation unnoticed by the user. Therefore, it is possible to prevent AF from being performed with an incorrect correction value. In the second exemplary embodiment, the limitation item from which the selected focusing point is excluded is configured so as not to allow a user to specify it. However, the second exemplary embodiment can be also carried out by only providing a different display for the limitation item from which the selected focusing point is excluded.

Having described specific exemplary embodiments of the present invention, it should be readily apparent that the present invention is not limited to these exemplary embodiments, and various modifications and changes can be made within the spirit and scope of the following claims.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-263705 filed Dec. 1, 2011, which is hereby incorporated by reference herein in its entirety.

The invention claimed is:

1. An imaging apparatus including a plurality of AF frames for automatic focusing based on a phase difference detection method, the imaging apparatus comprising:
   a memory configured to store a set value set in an adjustment mode, wherein the set value corresponds to at least one AF frame among the plurality of AF frames; and
   a controller configured to perform focus control by adding the set value to a result of focus detection by the automatic focusing by the phase difference detection method, wherein, in a shooting mode, in a case where an AF frame to be used in the focus control is different from an AF frame to which the set value is set, the controller notifies a user of this fact.

2. An imaging apparatus including a plurality of AF frames for automatic focusing based on a phase difference detection method, the imaging apparatus comprising:
   a memory configured to store a set value set in an adjustment mode, wherein the set value corresponds to at least one AF frame among the plurality of AF frames, and configured to perform focus control by adding the set value to a result of focus detection by the automatic focusing based on the phase difference detection method; and
   a controller configured to, in the adjustment mode, in a case where an AF frame selected for setting the set value is different from an AF frame to be used in the focus control in a shooting mode, notify a user of this fact.

3. The imaging apparatus according to claim 1, wherein the notification by the controller is information not notified of to the user in a case where the set value is set to the AF frame to be used in the focus control in the shooting mode.

4. The imaging apparatus according to claim 1, wherein, in the notification by the controller, in the shooting mode, in a case where the set value is set to the AF frame to be used in the focus control, this AF frame is displayed in a different manner from an AF frame to which the set value is not set.

5. The imaging apparatus according to claim 1, wherein the set value is a value corresponding to a difference between the result of the focus detection by the automatic focusing based on the phase difference detection method, and a result of focus detection by automatic focusing based on a contrast method.

6. The imaging apparatus according to claim 1, wherein the controller selects an AF frame again after the notification.

7. The imaging apparatus according to claim 1, wherein the controller shoots an image without selecting an AF frame again after the notification.

8. The imaging apparatus according to claim 2, wherein the notification by the controller is information not notified of to the user in a case where the AF frame to be set the set value is set to the AF frame to be used in the focus control in the shooting mode.

9. The imaging apparatus according to claim 2, wherein, in the notification by the controller, in the adjustment mode, in a case where the set value is set to the AF frame to be used in the focus control, this AF frame is displayed in a different manner from an AF frame to which the set value is not set.

10. The imaging apparatus according to claim 2, wherein the set value is a value corresponding to a difference between the result of the focus detection by the automatic focusing based on the phase difference detection method, and a result of focus detection by automatic focusing based on a contrast method.

11. The imaging apparatus according to claim 2, wherein the controller selects an AF frame again after the notification.

12. The imaging apparatus according to claim 2, wherein the controller stores the set value in the memory without selecting an AF frame again after the notification.

13. A method for controlling an imaging apparatus including a plurality of AF frames for automatic focusing based on a phase difference detection method, the method comprising:
   storing a set value set in an adjustment mode by a memory, wherein the set value corresponds to at least one AF frame among the plurality of AF frames; and
   performing focus control by adding the set value to a result of focus detection by the automatic focusing based on the phase difference detection method by a controller, wherein, in a shooting mode, in a case where an AF frame to be used in the focus control is different from an AF frame to which the set value is set, the controller notifies a user of this fact.

14. A method for controlling an imaging apparatus including a plurality of AF frames for automatic focusing based on a phase difference detection method, the method comprising:

storing a set value set in an adjustment mode, wherein the set value corresponds to at least one AF frame among the plurality of AF frames, and performing focus control by adding the set value to a result of focus detection by the automatic focusing based on the phase difference detection method by a memory; and notifying, in the adjustment mode, in a case where an AF frame selected for setting the set value is different from an AF frame to be used in the focus control in a shooting mode, a user of this fact by a controller.

* * * * *